United States Patent
Murawski

(10) Patent No.: US 7,975,459 B1
(45) Date of Patent: Jul. 12, 2011

(54) STRING TRIMMER ATTACHMENT FOR A RIDING LAWN MOWER

(76) Inventor: Eugene R. Murawski, Fowler, IL (US)

( * ) Notice: Subject to any disclaimer, the term of this patent is extended or adjusted under 35 U.S.C. 154(b) by 0 days.

(21) Appl. No.: 12/909,705

(22) Filed: Oct. 21, 2010

Related U.S. Application Data

(60) Provisional application No. 61/366,069, filed on Jul. 20, 2010.

(51) Int. Cl.
  *A01D 34/00* (2006.01)
(52) U.S. Cl. ......... 56/12.7; 56/13.5; 56/13.6; 56/DIG. 9
(58) Field of Classification Search ............... 56/2, 12.7, 56/13.5–13.8, DIG. 9
  See application file for complete search history.

(56) References Cited

U.S. PATENT DOCUMENTS

| | | | |
|---|---|---|---|
| 2,771,730 A * | 11/1956 | True | 56/11.6 |
| 2,991,612 A * | 7/1961 | Holmes | 56/11.4 |
| 5,600,943 A * | 2/1997 | Ryan | 56/13.6 |
| 6,256,970 B1 * | 7/2001 | Fleener | 56/12.7 |
| 6,343,461 B1 | 2/2002 | Knott | |
| 6,381,936 B1 * | 5/2002 | Lin | 56/16.7 |
| 6,415,586 B1 * | 7/2002 | Park | 56/12.7 |
| 6,474,053 B1 * | 11/2002 | Lund | 56/13.7 |
| 6,684,614 B2 | 2/2004 | Greenwell | |
| 7,219,488 B2 | 5/2007 | Hatfield | |
| 7,415,999 B1 * | 8/2008 | Price et al. | 144/4.1 |
| 2004/0237491 A1 | 12/2004 | Heighton et al. | |
| 2005/0044834 A1 | 3/2005 | Appleyard | |
| 2005/0102990 A1 | 5/2005 | Bares | |
| 2005/0193699 A1 | 9/2005 | Hatfield | |

* cited by examiner

*Primary Examiner* — Alicia M Torres
(74) *Attorney, Agent, or Firm* — Polster, Lieder, Woodruff & Lucchesi, L.C.

(57) ABSTRACT

A mower attachment, such as a string trimmer, is removably connectable to the forward end of a riding mower, such as a zero turn mower. The attachment is easily connected to and removed from the mower. The attachment has a control lever which is positioned on the attachment such that the attachment can be activated and deactivated by the mower operator using his or her feet, such that operator can operate the attachment and yet maintain his or her hands on the mower controls.

6 Claims, 4 Drawing Sheets

STRING TRIMMER ATTACHMENT FOR A RIDING LAWN MOWER

CROSS-REFERENCE TO RELATED APPLICATIONS

This application is a non-provisional application of, and claims priority to, U.S. Provisional App. No. 61/366,069 which was filed on Jul. 20, 2010, is entitled "STRING TRIMMER ATTACHMENT FOR A RIDING LAWN MOWER", and which is incorporated herein by reference.

STATEMENT REGARDING FEDERALLY SPONSORED RESEARCH OR DEVELOPMENT

Not Applicable.

BACKGROUND

This application relates to lawn care equipment, and in particular, to a string trimmer attachment for a riding lawn mower, particularly to a zero turn mower.

String trimmers are commonly used to trim lawns where mowers cannot reach, for example, around trees and gardens, under shrubs, adjacent walls, etc. String trimmers, especially gas powered string trimmers, can be heavy. To facilitate moving the string trimmers, the trimmers have been provided with wheels. However, string trimmers can generate extensive vibrations which can make handling even wheeled trimmers more difficult. Additionally, the vibrations, which travel up the handle of the trimmer, can cause injuries—such as carpal tunnel syndrome and repetitive stress injuries to the user.

It would be desirable to have a string trimmer which is easy to control and which will reduce or even eliminate repetitive stress injuries to the user.

SUMMARY

An attachment is provided for a riding mower, and in particular, a zero-turn mower. The riding mower comprises a forward deck, a seat rearwardly of the forward deck, and a pulley rotatingly mounted below the forward deck to be operatively driven by a motor of the mower. The mower attachment is adapted to be removably connected to the mower and to be driven by means of the mower pulley.

The mower attachment comprises an attachment deck. A spindle, with a tool (such as string) thereon, is mounted beneath the attachment deck to rotate relative to the attachment deck. Casters are mounted on opposite sides of the attachment deck to allow the attachment to be easily moved. An attachment pulley assembly of the mower attachment is mounted to the attachment deck. A driven belt extends between the attachment pulley assembly and the spindle to drive the spindle. A drive belt extends between the attachment pulley assembly and the mower pulley, so that the attachment spindle is driven by the mower engine.

A connecting assembly removably connects the mower attachment to the riding mower. The connecting assembly comprises a first connecting member which extends forwardly from the front of the mower forward deck and a second connecting member which extends rearwardly from a back of the attachment. The first and second connecting members being telescopingly connected, and thus at least one of the two is a tube which receives the other. In the illustrative embodiment shown, the first and second connecting members each comprise two arms. The two arms of the second connecting member are pivotally connected to the attachment deck and a grip extends between and connects the two arms of the second connecting member. Each connecting member has a fixed end and a free end and a stop extending outwardly from a point spaced from the free end of the connecting members. A biasing member is positioned on each pair of first and second connecting members between the stops of the connecting members. Lastly, a drive belt extends between attachment pulley assembly and the mower pulley, such that, when the mower pulley is rotated by the mower engine, the attachment spindle also will be rotated. As can be appreciated, the mower attachment is removably connectable to the forward end of the mower only by the two pair of connecting members and the drive pulley.

In accordance with one aspect of the attachment, the attachment includes a control lever. The control lever is movable between a first position in which the driven belt is tensioned, such that the spindle will rotate with rotation of the mower pulley and a second position in which the driven belt is slack, such that the spindle will not rotate, despite rotation of the mower pulley. The control lever is mounted to the attachment and positioned relative to the attachment deck, such that when the attachment is connected to the mower, the control lever can be moved between the first and second positions by the feet of an operator of the mower, such that the operator does not need his/her hands to operate the attachment.

BRIEF DESCRIPTION OF THE SEVERAL VIEWS OF THE DRAWINGS

Corresponding reference numerals will be used throughout the several figures of the drawings.

DETAILED DESCRIPTION

Figure 1:
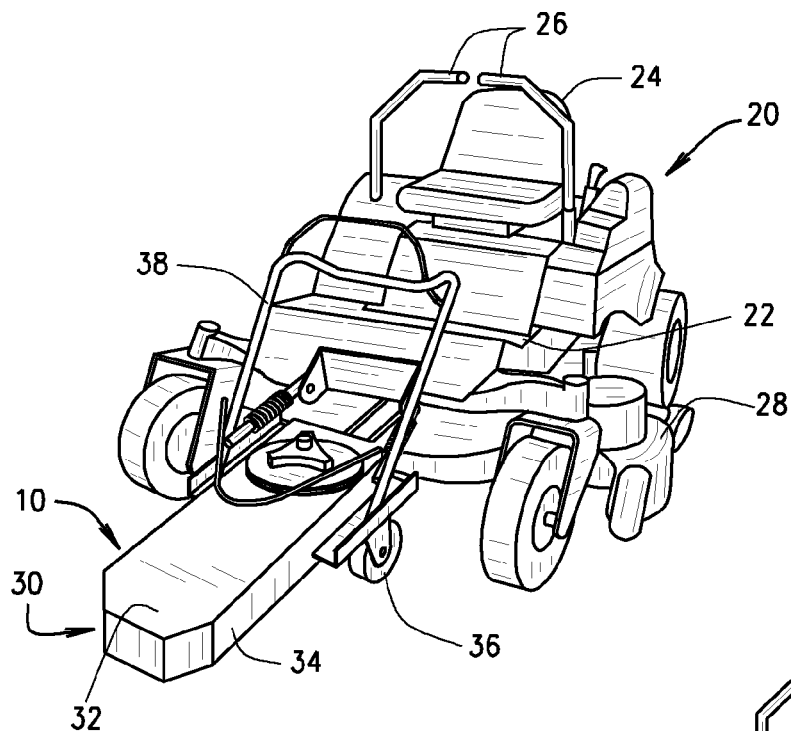
FIG. 1 is a perspective view of a string trimmer attachment mounted to a riding mower.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
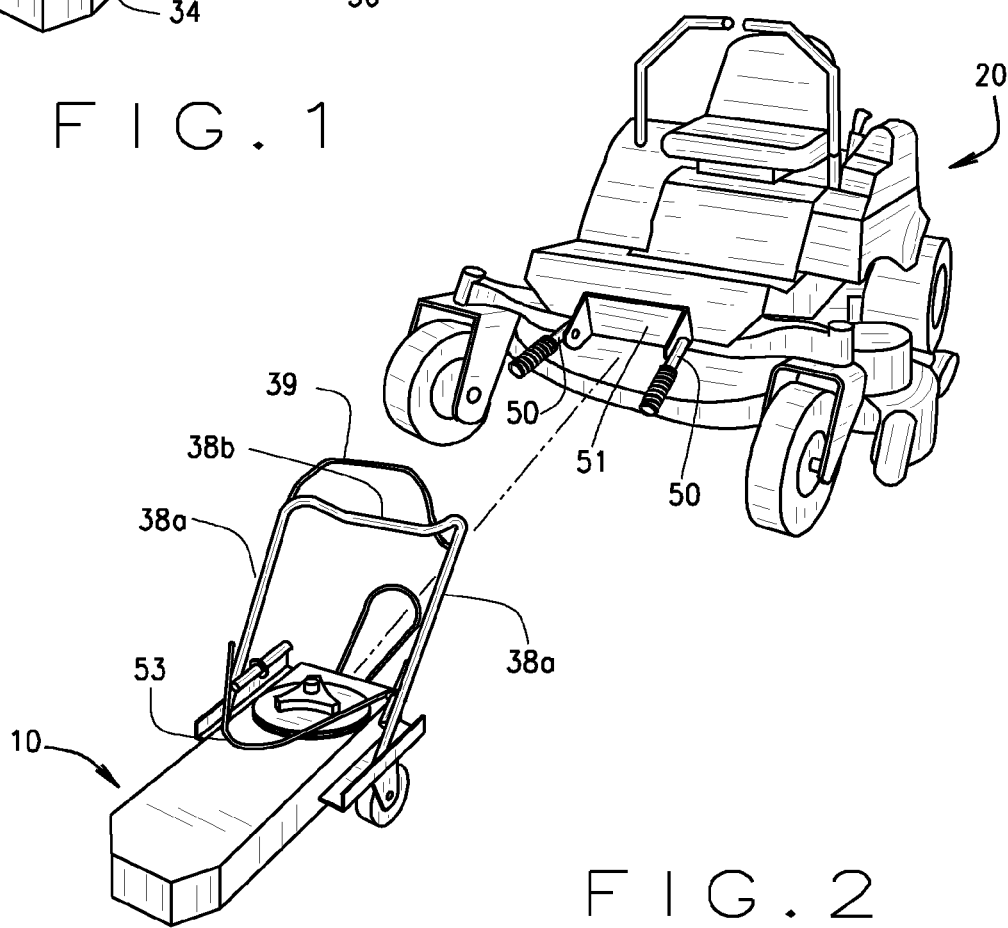
FIG. 2 is a perspective view of the string trimmer and riding mower, with the string trimmer detached from the riding mower.
Figure 3:
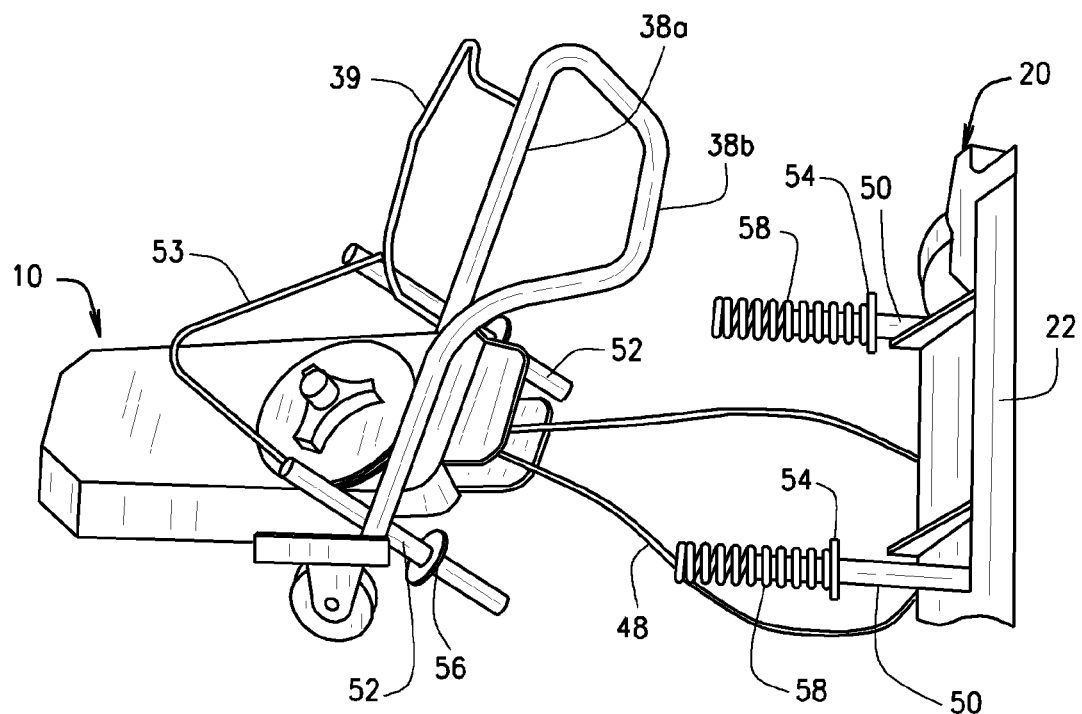
FIG. 3 is an enlarged view showing connecting rods of the string trimmer attachment and the riding mower.
Figure 4:
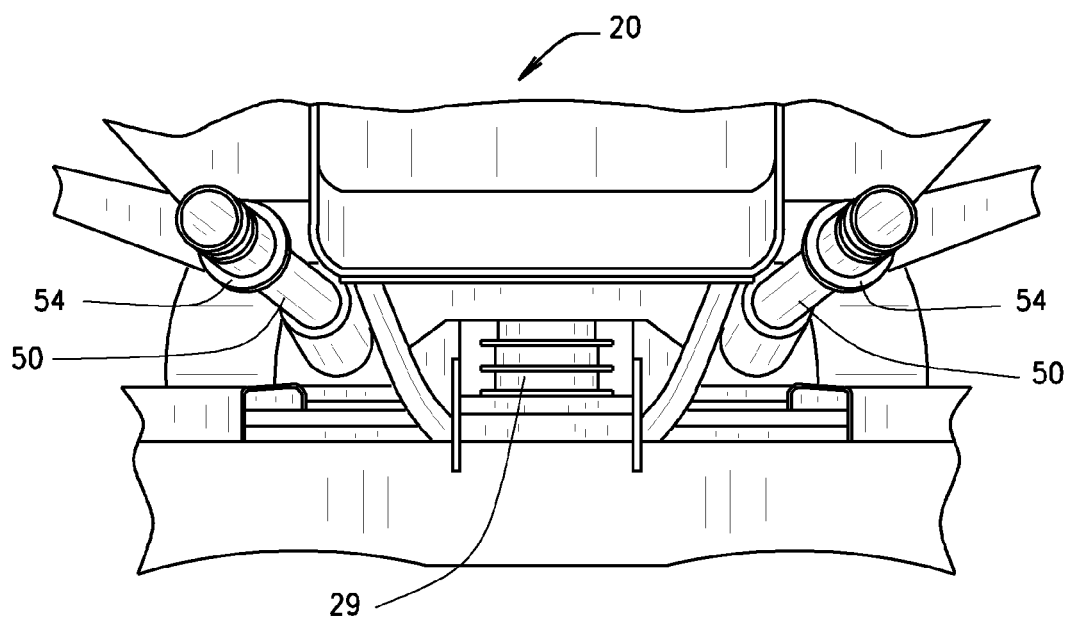
FIG. 4 is a front elevational view of the riding mower, showing the mower connecting rods and a mower pulley.
Figure 5:
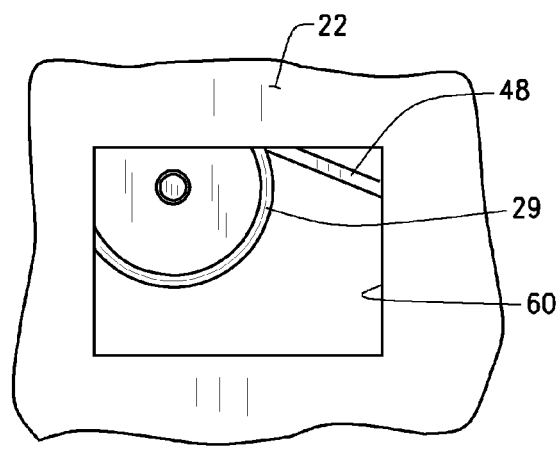
FIG. 5 is a top fragmentary view of the deck of the riding mower, showing an access port in the deck above the mower pulley.

Referring initially to FIGS. 1 and 2, a string trimmer attachment 10 is removably connectable to a riding mower 20 to extend from the front of the mower. The riding mower 20 is preferably a zero turn mower, and comprises a forward deck 22, a seat 24 behind the forward deck 22, right and left control levers 26, and a mower deck 28. The mower includes a pulley 29 (FIG. 6) mounted below the forward deck 22. The pulley 29 is operatively connected to the motor or engine of the riding mower 20 to be rotated or powered by the engine of the riding mower. As is known, the operator of the riding mower sits in the seat 24 and controls the movement of the mower with the control levers 26. Advantageously, in a zero turn mower, such as the riding mower 20, there is no structure of the riding mower that would block operator's view, and the operator can see the ground which is immediately in front of the riding mower. When the string trimmer attachment 10 is mounted to the riding mower, the mower operator will be able to easily see the trimmer to control the placement of the trimmer.

The string trimmer 10 has a trimmer deck 30 having a top surface 32 and a side wall 34. Caster wheels 36 are mounted to the trimmer deck side walls, on opposite sides of the trimmer deck and towards the back of the trimmer deck. A handle bar 38 extends upwardly and rearwardly from the back of the trimmer deck. The handle bar 38 extends from the trimmer deck 30. The handle bar 38 comprises two side posts 38a which are connected to and extend from the trimmer deck and a generally U-shaped handle portion 38b which extends between the side posts 38a. As seen, the handle portion 38b extends rearwardly from the top of the posts 38a. A control lever 39 extends from the handle upper portion 38b. A spindle 40 (FIG. 8) extends from the bottom of the trimmer deck 30 towards the front of the trimmer deck. The spindle 40 is secured to the trimmer deck so that it can rotate freely relative to the trimmer deck. A pulley 42 and a reel 44 are mounted to the spindle 40 to rotate with the spindle. The reel 44 contains string 46, which extends from the reel, and, cuts grass, weeds, etc. when rotated. The spindle is rotated by the mower engine by means of a belt 48 which extends between the mower pulley 29 and a second trimmer pulley (not shown) located towards the back of the trimmer deck 30. A second belt extends between the second trimmer pulley and the trimmer pulley 42. Hence, the string trimmer attachment is powered by the mower, and a separate engine or motor is not required to operate the string trimmer attachment.

To connect the string trimmer attachment 10 to the riding mower 20, the mower is provided with a pair of spaced apart connecting tubes 50 which are mounted to the mower to extend forwardly of the mower deck 32. The tubes 50 can be connected to the mower, for example, by means of a bracket 51. The string trimmer attachment 10 includes a pair of connecting rods 52 which are pivotally connected to the string trimmer attachment. The two rods 52 are connected to each other by a grab bar 53. The connecting rods 52 can be connected to the side wall 34 of the trimmer deck or to the posts 38a of the handle 38. The connecting rods 52 are sized to be telescopingly received in the connecting tubes 50. Although the connecting tubes 50 are shown and described as being mounted to the mower and the connecting rods 52 are shown and described as being mounted to the string trimmer attachment, it will be apparent that they could be reversed, such that the connecting tubes 50 are connected to the string trimmer attachment and the connecting rods are connected to the mower. The connecting tubes 50 and the connecting rods 52 are each provided with stops 54, 56, respectively, which extend outwardly from each of the tubes 50 and rods 52. The stops can be in the form of washers which are fixed to the tubes 50 and rods 52 to be parallel to the axis of the rods and tubes. A spring 58 is journaled over each pair of connecting tubes 50 and connecting rods 52, and is compressed between the stops 54, 56, as seen for example, in FIG. 7. As can be appreciated, the springs push against the stops 56 on the connecting rods 52 extending from the string trimmer attachment, to push the string trimmer attachment 10 forwardly, away from the riding mower. As can be appreciated, the force of the springs 58 will tighten the pulley belt 48. Hence, the string trimmer attachment 10 is connected to the mower 20 by three connections—the pulley belt 48 and the two pair of connecting tubes 50 and rods 52. If desired, an elongated generally "L⌐⌐⌐⌐⌐⌐"-shaped rod 59 (FIG. 6) can be mounted to the front of the mower 20 above the connecting arms 50. The rod 59 defines a gap with the front of the mower which can receive the handle 38 of the attachment 10. The rod 59 holds the handle 38 loosely to help prevent the attachment 10 from pivoting too much relative to the mower 20.

Figure 6:
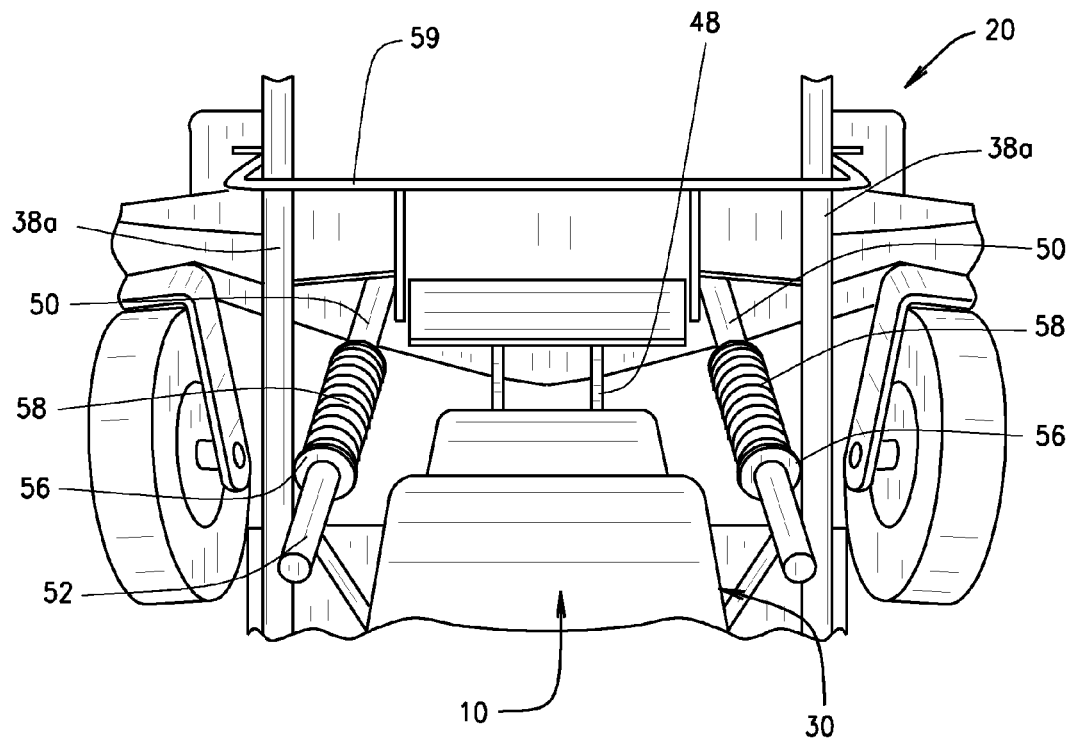
FIG. 6 is a fragmentary view showing the connection of the string trimmer attachment to the riding mower.
Figure 7:
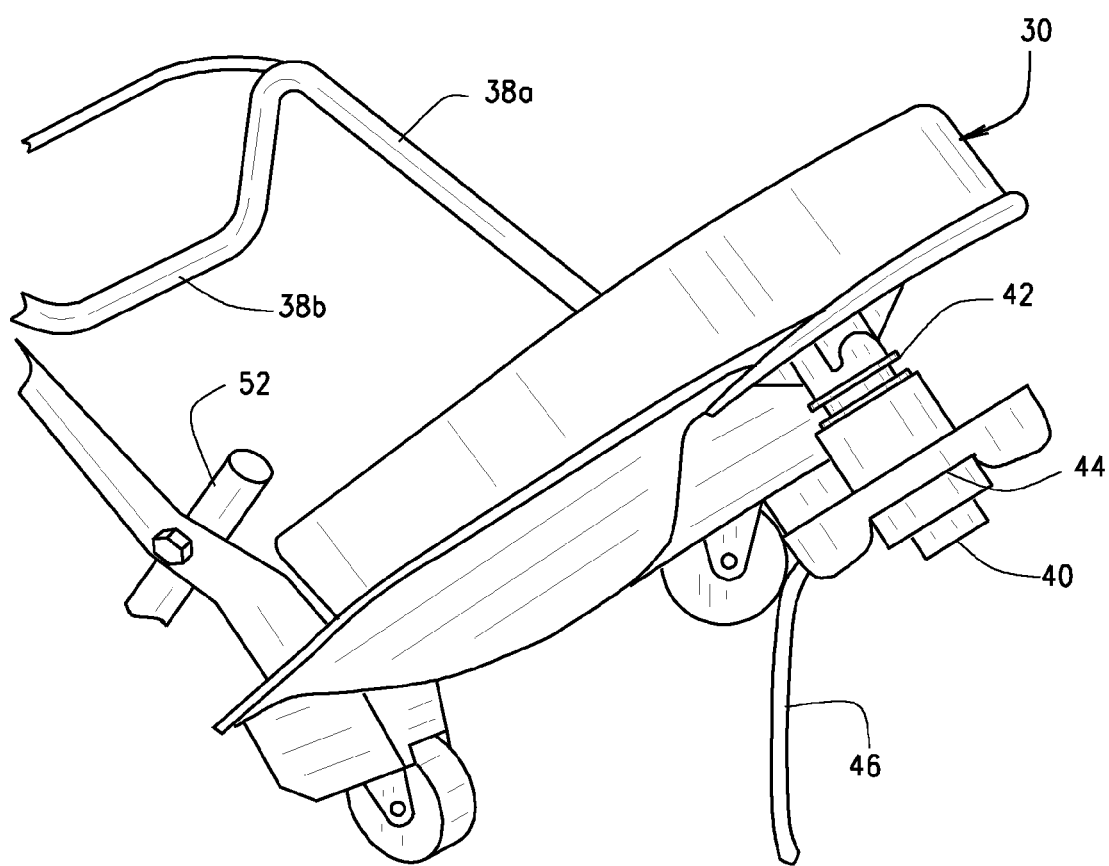
FIG. 7 is a perspective view, showing the underside of the string trimmer attachment.

Attachment of the string trimmer attachment 10 to the mower 20 is quite easy. The connecting rods 52 are slid into the connecting tubes 50 with the springs 58 in place. The springs 58 are compressed slightly to facilitate mounting the pulley belt 48 about the two pulleys 29 and 42. To facilitate mounting the belt 48 about the mower pulley 29, an opening 60 can be provided in the mower forward deck 22, as shown in FIG. 6, above the pulley 29 to provide easier access to the pulley 29. The opening 60 can be provided with a closure or cover (not shown) so that items cannot fall through the hole 60 during operation of the mower and/or string trimmer attachment.

As noted above, the string trimmer attachment is powered by the mower motor by way of the belt 48 and pulleys 29, 42. However, it is not desirable to have the string trimmer attachment operating at all times. To this end, the string trimmer attachment includes the control lever 39 which is pivotally mounted to the handle 38 between the handle posts 38a. A control cord is connected at one end to the control lever 39 and is operatively connected at an opposite end to a tension pulley, about which the second belt extends. The control lever 39 is movable between a first position in which the control cord pulls against the tension pulley, such that the tension pulley does not bear against the second belt, and a second position in which the control cord is slack, and the tension pulley bears against the second belt. In the first position of the control lever, the second belt is tensioned, and the spindle 40, and hence the string 46, will rotate. In the second position of the control lever, the tension pulley does not bear against the second belt, and hence the second belt is slack. In this position, the spindle will not rotate, despite the fact that the second pulley may be rotated by the mower motor.

As can be appreciated, the operator needs both hands to control the zero turn mower. Hence, the handle 38 is sized and shaped such that the operator can move the control lever 39 between its two noted position with his or her feet. Thus, the sting trimmer attachment can be activated and deactivated by the driver with his or her feet while the driver is operating the mower.

As various changes could be made in the above constructions without departing from the scope of the claimed invention, it is intended that all matter contained in the above description or shown in the accompanying drawings shall be interpreted as illustrative and not in a limiting sense. Although the connecting tubes 50 are shown essentially fixed to the mower deck, the tubes 50 could be provided with a mounting bracket, such that the connecting tubes 50 could be mounted to, and removed from, a riding mower. This would an existing riding mower to be retrofitted to allow the trimmer attachment 10 to be connected to the riding mower. The use of a mounting bracket also allows for the connecting rods 50 to be easily removed from the mower 20, should the rods 50 interfere with a particular use of the mower when the trimmer 10 is not attached to the mower 20. Although the attachment 10 is a string trimmer attachment, it will be apparent that the attachment 10 could be any other lawn care device in which there is a rotating element. These examples are merely illustrative.

The invention claimed is:

1. In combination, a riding mower and a mower attachment:
   the riding mower comprising a forward deck, a seat rearwardly of the forward deck, and a mower pulley rotatingly mounted below the forward deck to be operatively driven by a motor of the mower;
   the mower attachment comprising an attachment deck, a spindle mounted beneath the attachment deck to rotate relative to the attachment deck, the spindle having a tool operatively mounted thereon; and casters mounted on opposite sides of the attachment deck; an attachment pulley assembly; and a driven belt extending between the attachment pulley assembly and the spindle;
   a connecting assembly for removably connecting the mower attachment to the riding mower; the connecting assembly comprising a first pair of connecting members extending forwardly from the front of the mower forward deck and a second pair of connecting members extending rearwardly from a back of the attachment; the first and second connecting members being telescopingly connected; each connecting member having a fixed end and a free end and a stop extending outwardly from a point spaced from the free end of the connecting members;
   a drive belt sized to extend between the attachment pulley assembly and the mower pulley; whereby, when the mower pulley is rotated, the spindle will be rotated;
   the connecting assembly further including a biasing member positioned on each pair of first and second connecting members between the stops of the connecting members to bias the stops of the first and second connecting members apart from each other when the first and second connecting members are telescopingly connected, and hence to bias apart the attachment pulley assembly and the mower pulley to place tension on the drive belt for aiding transmission of the rotational forces and to maintain the engagement of the mower attachment to the mower;
   whereby, the mower attachment is removably connected to the forward end of the mower only by the two pair of connecting members and the drive belt;
   a control lever; the control lever being movable between a first position in which the driven belt is tensioned, such that the spindle will rotate with rotation of the mower pulley and a second position in which the driven belt is slack, such that the spindle will not rotate, despite rotation of the mower pulley; the control lever being mounted to the attachment and positioned relative to the attachment deck, such that when the attachment is connected to the mower, the control lever can be moved between the first and second positions by the feet of an operator of the mower, such that the operator does not need his/her hands to operate the attachment; and
   wherein the first and second connecting members comprise tubes and posts.

2. The combination of claim 1 wherein the tool is string, such that the attachment is a string trimmer.

3. A riding mower attachment comprising:
   an attachment deck; the attachment deck comprising a top surface and a side wall; a spindle rotatably mounted beneath the attachment deck top surface to rotate relative to the attachment deck, the spindle having a tool operatively mounted thereon; and casters mounted on opposite sides of the attachment deck; an attachment pulley assembly; and a driven belt extending between the attachment pulley assembly and the spindle;
   a first connecting member connectable to a riding mower to extend forwardly from a front of the mower and a second connecting member extending rearwardly from a back of the attachment; the first and second connecting members being sized and shaped such that one of the first and second connecting members is telescopingly received by the other of the first and second connecting members; each connecting member having a fixed end and a free end and a stop extending outwardly from a point spaced from the free end of the connecting members;
   a drive belt sized to extend between the attachment pulley assembly and a pulley of the mower;
   a biasing member positioned on each of said of first and second connecting members between the stops of the connecting members to bias the attachment pulley assembly and the mower pulley apart from each other when the first and second connecting members are telescopingly connected, and to place tension on the drive belt for aiding transmission of rotational forces from the mower pulley; and to maintain the engagement of the mower attachment to the mower;
   a control lever; the control lever being movable between a first position in which the driven belt is tensioned, such that the spindle will rotate with rotation of the mower pulley and a second position in which the driven belt is slack, such that the spindle will not rotate, despite rotation of the mower pulley; the control lever being mounted to the attachment and positioned relative to the attachment deck, such that when the attachment is connected to the mower, the control lever can be moved between the first and second positions by the feet of an operator of the mower, such that the operator does not need his/her hands to operate the attachment; and
   wherein the first and second connecting member each comprise two arms; the arms of one of the first and second connecting members being tubes which receive the arms of the other of the first and second connecting members.

4. The riding mower attachment of claim 3 wherein the arms of the second connecting member are pivotally connected to the attachment deck.

5. The riding mower attachment of claim 4 further comprising a grip extending between and connecting the arms of the second connecting member.

6. The combination of claim 3 wherein the tool is string, such that the attachment is a string trimmer.

* * * * *